United States Patent [19]
Clark et al.

[11] 3,878,894

[45] Apr. 22, 1975

[54] PROCESS FOR RECOVERING HYDROCARBONS USING OVERBASED LINEAR ALKYLATE SULFONATES AS WATERFLOOD ADDITIVES

[75] Inventors: Charles R. Clark; M. Duane Gregory; Oliver C. Kerfoot, all of Ponca City, Okla.; Delmar D. Krehbiel, Lubbock, Tex.; Carl D. Kennedy, Ponca City, Okla.

[73] Assignee: Continental Oil Company, Ponca City, Okla.

[22] Filed: Sept. 5, 1974

[21] Appl. No.: 503,550

Related U.S. Application Data

[62] Division of Ser. No. 335,605, Feb. 26, 1973, abandoned.

[52] U.S. Cl. ............... 166/270; 166/274; 166/275; 252/8.55 D
[51] Int. Cl. .............................................. E21b 43/22
[58] Field of Search ........ 166/274, 275, 270, 305 R; 252/8.55 D; 260/505 N, 505 RX, 505 AX

[56] References Cited
UNITED STATES PATENTS

| | | | |
|---|---|---|---|
| 2,197,800 | 4/1940 | Henke et al. | 252/8.55 D |
| 2,688,035 | 8/1954 | Jacob et al. | 260/505 N |
| 2,999,812 | 9/1961 | Krahler | 252/8.55 D |
| 3,057,896 | 10/1962 | Schlicht et al. | 260/504 R X |
| 3,111,984 | 11/1963 | Reisberg | 166/270 |
| 3,302,711 | 2/1967 | Dilgren | 166/270 |
| 3,302,713 | 2/1967 | Ahearn et al. | 166/275 X |
| 3,392,782 | 7/1968 | Ferrell et al. | 166/275 |
| 3,436,347 | 4/1969 | Otto et al. | 252/33 |
| 3,804,171 | 4/1974 | Krehbiel et al. | 166/274 X |

*Primary Examiner*—Stephen J. Novosad
*Attorney, Agent, or Firm*—F. Lindsey Scott

[57] ABSTRACT

An improved anionic waterflood additive is prepared by chlorinating a normal alkane having about 10 to about 18 carbon atoms to about 15 to about 45 weight percent chlorine content; employing the chlorinated alkane to alkylate an aromatic hydrocarbon such as benzene; sulfonating the thus formed alkylate to form a sulfonic acid; converting the sulfonic acid to a sulfonate by reacting with a base component such as an alkali metal hydroxide, ammonium hydroxide, or an akali metal carbonate; and overbasing the sulfonate by admixing with an excess of base component such that the ratio: "weight of excess base component/weight of sulfonate" is about 0.03 to about 2.0. The anionic waterflood additive is injected into a petroliferous formation, the formation is waterflooded, and oil is recovered.

8 Claims, No Drawings

PROCESS FOR RECOVERING HYDROCARBONS USING OVERBASED LINEAR ALKYLATE SULFONATES AS WATERFLOOD ADDITIVES

This is a division of application Ser. No. 335,605 filed 2-26-73, now abandoned.

BACKGROUND OF THE INVENTION

1. Field of the Invention

In one aspect, this invention relates to an improved anionic waterflood additive.

In another aspect, this invention relates to a process for the recovery of hydrocarbons from a petroliferous formation involving injecting into the petroliferous formation an improved anionic waterflood additive plus water.

2. Brief Description of the Prior Art

A large percentage of the oil in petroliferous formations is held within the rock of the formation by the surface forces between the formation rock, the oil therein, and the aqueous liquid in the formation. As a result, a substantial portion of such oil usually remains in the rock of the formation even when wells traversing the formation are no longer productive. Various secondary recovery techniques such as thermal recovery, gas injection, and waterflooding have been suggested for the recovery of this fixed oil which remains in the formation after primary recovery methods are no longer feasible to produce additional oil. Of the secondary recovery techniques, waterflooding is quite commonly employed, and a multiplicity of methods have been suggested for improving the efficiency and economy of oil recovery by the practice of waterflooding. Such methods frequently include incorporation of a water-soluble surfactant in the waterflood which is injected into the petroliferous formation. A number of typical surfactants have been proposed for this purpose, including alkyl pyridinium salts, sodium lauryl sulfate, certain sulfonates, glycosides, sodium oleates, quaternary ammonium salts, and the like. The use of such surfactants has arisen because it is widely recognized that a low interfacial tension between the surfactant flood water and the reservoir crude oil is beneficial to the improvement of recovery efficiencies and feasibilities.

Recently it has been proposed that nonionic surfactant solutions, such as polyoxyethylene-polyoxypropylene copolymer containing solution be injected into the formation through a first of a series of two well bores to thereby displace the hydrocarbons of the formation toward a second well bore. The nonionic surfactant flood is then followed by an injection of a slug of aqueous caustic mixture into the formation through the first well bore to displace the hydrocarbon of the formation and the injected surfactant toward the second well bore. The caustic slug has a basicity of at least 1.5 ph levels greater than that of the native formation waters. However, the use of the nonionic surfactant has not fully met the needs of the industry for a desirable waterflood surfactant composition, and new compositions are constantly being sought which will allow recovery of the residual oil remaining in the formation following primary oil recovery operations. Also, the surfactant materials of the prior art have on occasion suffered from lack of availability, or from non-feasibility due to excess costs, and thus have not entirely satisfied the long-felt need of the industry for a feasible method to recover oil remaining in subterranean petroliferous formations.

OBJECTS OF THE INVENTION

An object of the invention is to provide an improved waterflood additive, and a method for using the waterflood additive in the recovery of secondary hydrocarbons from petroliferous formations.

These and other objects, advantages, and features of this invention will become apparent to those skilled in the art from a reading of the following detailed description and claims.

SUMMARY OF THE INVENTION

According to the present invention, we have now found an improved anionic waterflood additive which comprises an overbased sulfonate derived from alkylate product which in turn is derived from a chlorinated normal alkane where in the chlorination is about 20 to about 45 weight percent and an aromatic hydrocarbon.

Further, according to the invention, we have found that injection of the improved anionic waterflood additive plus water into a petroliferous formation results in recovery of substantial yields of hydrocarbons therefrom.

One method of employing the anionic waterflood additive of the instant invention includes a first step of injecting a slug of an aqueous mixture containing about 0.5 to 25 percent of the overbased sulfonate into the formation through an injection well and thence recovering displaced hydrocarbons from the formation through a production well. Additional hydrocarbons can be recovered, if desired, by injecting an effective amount of an aqueous slug of base component into the petroliferous formation after the overbased sulfonate slug has been injected.

Another method of recovering hydrocarbons from a petroliferous formation involves injecting a first slug of an aqueous mixture containing about 0.5 to 25 weight percent of the sulfonate derived from the alkylate product into the petroliferous formation followed by an amount of an aqueous base component containing mixture sufficient to overbase the sulfonate such that the overbased sulfonate is formed in situ by the contacting of the aqueous sulfonate containing slug and the aqueous base component containing slug.

DESCRIPTION OF THE PREFERRED EMBODIMENTS

The instant invention relates to an improved anionic waterflood additive. The waterflood additive is prepared by chlorinating a normal alkane having about 10 to about 18 carbon atoms to about 20 to about 45 weight percent chlorine content; employing the chlorinated alkane to alkylate an aromatic hydrocarbon; sulfonating the thus formed alkylate to form a sulfonic acid; converting the sulfonic acid to a sulfonate by reacting with a base component; and overbasing the sulfonate by admixing therewith an excess of base component so that the ratio: "weight of excess base component/weight of sulfonate" is about 0.03 to about 2.0.

The instant invention also relates to injecting the improved anionic waterflood additive into a petroliferous formation with water to promote the recovery of oil from the formation.

The normal alkane which is chlorinated has about 10 to about 18 carbon atoms per molecule. Examples of such alkanes include decane, octadecane, hexadecane, dodecane, and the like. Mixtures can be employed.

Suitable normal alkanes which can be employed can be readily derived by several well-known processes. Two of such well-known processes are the molecular sieve process and the urea adduction process for recovery of such alkanes from petroleum derived streams such as kerosene streams.

The molecular sieve method for the recovery of normal alkanes from hydrocarbon mixtures containing such alkanes involves contacting a zeolitic molecular sieve with a suitable hydrocarbon mixture such as kerosene at a temperature of about 200°F to about 500°F and at a pressure of about 200 psi to about 1,000 psig. The zeolitic molecular sieve can be continuously contacted with the hydrocarbon feedstream until the effluent leaving an adsorption unit containing the molecular sieve begins to evidence an increased amount of alkane content. When the adsorption medium, such as the zeolitic molecular sieve is saturated with sorbed alkanes, as indicated by an increased content of normal alkanes in the effluent, the alkanes are desorbed from the sorbent and recovered.

The urea adduction method provides an alternative method for the recovery of suitable normal alkanes. The urea adduction process involves crystallizing urea in the presence of a mixture of hydrocarbons containing the normal alkanes to be separated. The normal alkanes are selectively adsorbed by formation of a relatively stable crystalline complex with urea which is separable by filtration. In the formation of the complex, the urea molecules can be visualized to wrap around the straight-chain molecules of the n-alkanes in a hexagonal spiral, the spirals forming channels sufficiently large to accommodate the straight-chain normal alkanes but not branched alkanes or cyclic hydrocarbons.

The quantity of urea required for the formation of an adduct with a normal alkane is about 3.5 parts of urea per part of normal alkane desired to be adducted. Larger or even somewhat smaller amounts of the urea in relation to the normal alkane can be employed, but it is preferred to employ approximately the numerical ratio stated. The use of an activator in conjunction with urea is desirable.

The process for effecting a separation of the normal alkanes by the urea adduction method comprises adding the hydrocarbon feedstock which contains suitable normal alkanes to a solution of urea and an activator while constantly stirring the mixture. The time in which the complexes are formed is relatively short, that is, usually about an hour, and generally not in excess of about two hours. Once complexing has occurred, the mixture is filtered and then washed with a suitable hydrocarbon solvent, such as butane, pentane, hexane, or the like. The washed crystals are then suitably decomposed, as in hot water, to yield the adducted normal alkanes. It is preferred to carry out the decomposition of the adduct at a temperature in the range of about 80° to about 90°C. Operation at an elevated temperature of this magnitude permits flashing off of any residual hydrocarbon solvent retained by the complex crystal. Multiple adduction procedures can be employed, and a multiple stage adduction process is often more efficient than a one-stage process.

Suitable normal alkane products can be obtained by other processes or can be obtained commercially. It is only critical that the material be substantially composed of normal alkanes having about 10 to about 18 carbon atoms per molecule.

The chlorinated alkane which is employed can be readily prepared by chlorinating the normal alkane by any suitable method known to the art to chlorinate such normal alkanes. Liquid or vapor phase chlorination procedures can be employed. The amount of chlorine in the chlorination product must, however, be within the range of about 15 to about 45 percent based upon the weight of the chlorine and the total weight of the chlorinated alkane. It is presently preferred that the chlorinated derivatives contain about 20 to about 35 weight percent chlorine. It is emphasized that the chlorinated alkanes of this invention have a considerably higher degree of chlorination than those employed in synthesizing conventional detergent alkylates. Consequently, the alkylate product formed upon subsequent alkylation of an aromatic hydrocarbon with such chlorinated alkane products is considerably different than the alkylate formed by alkylating an aromatic hydrocarbon with the more usual chlorinated alkane derivatives which have about 4 or 5 weight percent chlorine content.

The chlorine content of the chlorinated alkane derivative can readily be determined by conventional chemical analyses. It is well within the skill of those skilled in the art to produce a chlorinated alkane derivative having the degree of chlorination desired. The chlorinated derivative is essentially comprised of mono- and polychloroalkanes.

To produce the alkylate of this invention, the chlorinated alkane is employed to alkylate an aromatic hydrocarbon. The alkylation is conducted in the presence of a suitable Friedel-Crafts catalyst. The Friedel-Crafts catalysts are a group well-known to those skilled in the art. Presently, it is particularly preferred that aluminum chloride be employed as a catalyst for the alkylation reaction. Such alkylation reactions and catalysis thereof, as well as the conditions under which such are run, are well-known to those skilled in the art.

The aromatic hydrocarbon that is alkylated with the chlorinated alkane can be represented as follows:

$$Ar-(R')_n$$

wherein Ar is a benzene or naphthalene ring having a valence or n; wherein R' is methyl or ethyl; and wherein n is 0, 1, or 2. Some examples of suitable aromatic hydrocarbons include benzene, napthalene, toluene, xylenes, methylbenzene, diethylbenzenes, diethylnaphthalenes, and the like.

The alkylation reaction temperature to produce the alkylates can be varied considerably, ranging from about 25° to about 80°C. A temperature range which is particularly suitable is about 40° to about 50°C.

The ratio of aromatic hydrocarbon to chlorinated normal alkane can be varied over wide limits. For example, ratios such as about 1 to about 25 parts by weight of the aromatic hydrocarbon per 1 part by weight of the chlorinated alkane can be employed. Ratios of about 5:1 to about 10:1 are particularly desirable.

The amount of alkylating catalyst such as aluminum chloride which is employed for effecting alkylation can conveniently be based upon the weight of the chlorinated alkane derivative present in the reaction environment. On this basis, about 1 to about 10 percent by weight of aluminum chloride is suitable. The use of aluminum chloride sludge for recycle is advantageous to the process. By recycling the sludge, less fresh aluminum chloride needs to be added to the reaction environment. This results in considerable savings. Also, better product yields are obtained since less of the reactants and product are complexed with the catalyst and lost thereby. Recycle sludge can amount to about 10 to about 100 weight percent or more of the chlorinated alkane charge. Preferably, about 50 to about 100 weight percent of recycle sludge is charged based upon the chlorinated alkane derivative charged.

The alkylation reaction can be effected in a continuous or batch-wise manner. Effective contact time between the catalyzed reactants is desirably about 15 to about 60 minutes. The precise time needed for effecting alkylation is dependent upon a number of factors including the amount of catalyst used, the ratio of aromatic hydrocarbon to chlorinated alkane derivatives employed, the temperature, and the like. Those skilled in the alkylation art can readily optimize such parameters.

The alkylation reaction product is charged to a separator where the catalyst sludge is removed upon completion of the desired degree of alkylation. When the sludge has been removed, the alkylate is washed. Thereafter, the alkylate product can be sulfonated per se, or can be subjected to fractional distillation to recover particularly desired fractions which are then subjected to sulfonation.

According to one presently preferred embodiment, the alkylate product is subjected to fractional distillation to remove the monoalkylate product and other similar molecular weight species from the desired high molecular weight products, that is, the bottom fraction. The temperature at which such fractional distillation cuts are made will vary somewhat depending upon the particular aromatic hydrocarbon and upon the particular chlorinated normal alkane employed for the alkylation reaction. However, where the aromatic hydrocarbon is benzene, the distillation cut will be generally within the range of about 190° to about 240°C at 10 mm Hg pressure, depending largely upon the length of the alkyl constituent of the alkylate. Thus, when the alkyl component of the alkylate is derived from a mixture of $C_{10}$ to $C_{12}$ normal alkanes, the fractionation of the alkylate is carried out at a temperature of about 200°C at 10 mm Hg pressure. On the other hand, when the alkyl component of the alkylate is derived from a mixture of $C_{10}$ to $c_{14}$ normal alkanes, the fractionation is carried out at a temperature of about 210° to about 215°C at 10 mm Hg pressure. Thus, alkylates having an alkyl component having a greater molecular weight require increased temperature at which the fractionation cut is taken.

According to another presently preferred embodiment, the separated distillate fraction of the alkylate product, that is, the monalkyl aromatic compound and similar molecular weight species, is recycled to the alkylation reaction when the process is done in a continuous manner, or is recycled to a subsequent batch when the alkylation reaction is done in a batch-wise manner. In this way, the monoalkyl aromatic compounds formed in the alkylation reaction are converted to higher molecular weight alkylate products.

Once the alkylation conversion has been carried out and the desired alkylate products recovered, the alkylate products are sulfonated to form a sulfonic acid. As pointed out heretofore, the alkylate product which is sulfonated can be either the total alkylate product formed in the above-noted alkylation reaction, can be an alkylate bottoms product formed by taking fractional distillation cuts, can be an alkylate product wherein recycle of monoalkyl aromatic compounds is practiced, can be fractions of the residue left when the monoalkyl aromatic compounds and similar molecular weight materials are distilled from the total alkylate product, or can be mixtures of such alkylate products.

The sulfonation conversion of the alkylate product to the sulfonic acid derivative thereof can be by any procedure heretofore known to the art for the sulfonation of a sulfonatable hydrocarbon. A number of sulfonation procedures are known in the art wherein $SO_3$, mixtures of $SO_3$ and $SO_2$, or organic sulfonating agents containing $SO_3$ are employed as a sulfonating agent. Furthermore, the sulfonation can be carried out in either a batch-type process or a continuous falling film reaction process. When $SO_3$ is employed as a sulfonating agent, the mole ratio of $SO_3$ to alkylate product is suitably about 1:1 to about 1.5:1. Thus, each molecule of alkylate product should have on the average about one or more sulfonic acid groups thereon following the sulfonation reaction.

The sulfonic acids formed by the sulfonation reaction are then converted to the respective sulfonates by reacting with a base component. The conversion to the sulfonates is readily effected by simply admixing the base component with the sulfonic acids. This can be accomplished by any means known to the art for the conversion of sulfonic acids to sulfonates. Such procedures are well-known to those skilled in the art.

The base component employed in this invention is selected from the alkali metal hydroxides, ammonium hydroxide, and the alkali metal carbonates. Examples of such base components include: NaOH, KOH, LiOH, $Na_2CO_3$, $NaHCO_3$, $NH_4OH$, $K_2CO_3$, and the like. Sodium hydroxide is presently particularly preferred as a base component.

The improved anionic waterflood additives of the instant invention are overbased alkylate product sulfonates wherein the sulfonates are derived as heretofore set forth.

The overbase sulfonates have excess base component added beyond that needed to neutralize the sulfonic acid precursors to the sulfonates such that the ratio: "weight of excess base component/weight of sulfonate" is about 0.3 to about 2.0. Overbased sulfonates wherein the ratio is about 0.20 to about 1.0 are presently particularly preferred.

Thus, when the sulfonates are merely neutralized and injected as an aqueous mixture of the neutralized product into the petroliferous formation, a sufficient amount of the aqueous base component must be added in a second slug to insure that the waterflood additive composition formed in situ in the formation is overbased and is in the prescribed ranges.

In describing the use of the anionic waterflood additives of the instant invention, two methods of injecting the additives into a petroliferous formation will be discussed. However, it should be understood that neither method is presently particularly preferred over the other, and that the particular method which is chosen for a particular application will depend to a large extent upon the facilities available at the well site.

One method of employing the anionic waterflood additive of the instant invention involves injecting an aqueous slug containing about 0.5 to about 25 weight percent of the alkylate product sulfonate through a well bore into a petroliferous subterranean formation from which additional hydrocarbon is to be recovered. After the sulfonate slug has been dispersed into the formation, an effective amount of an aqueous base component mixture in the form of a second slug is introduced into the formation to form an aqueous mixture in situ in the subterranean formation containing about 0.5 to about 25 weight percent of the overbased waterflood additive composition. When employing such a method, a sufficient amount of the base component containing a mixture must be injected into the formation to assure that the waterflood additive will be overbased such that the "ratio" is about 0.03 to about 2.0. If sufficient base component is not added to reach the lower minimum ratio of about 0.03, desirable results are not obtained. Likewise, problems (of viscosity and handling of materials) are encountered when the amount of overbasing is above the upper ratio value of about 2.0.

A second system which can be employed in employing the anionic waterflood additive compositions of the instant invention involves producing the overbased sulfonate, admixing with water, and injecting the aqueous mixture containing from about 0.5 to about 25 weight percent of the overbased alkylate product sulfonate directly into the petroliferous formation as one slug. When employing this procedure, the same limitations as to the overbasing ratio apply as to the procedure heretofore described.

While the overbased sulfonates demonstrate remarkable properties as waterflood additives in the second system described, additional tertiary oil can be recovered from the subterranean petroliferous formation by injecting an effective amount of an aqueous mixture containing a base component into the formation which has previously been contacted with the overbased sulfonate composition. The amount and concentration of the aqueous base component containing mixture employed can vary widely. However, desirable results are obtained when the concentration of the base component in the mixture is about 0.5 to about 50 percent by weight, and the amount of mixture injected into the formation is about 10 to about 1,000 volume percent based on the amount of sulfonate containing slug injected into the formation.

As heretofore stated, the material injected into the petroliferous formation is an aqueous mixture containing about 0.5 to about 25 weight percent of the overbased alkylate product sulfonate waterflood additive. Particularly desirable results are obtained when the aqueous mixture injected into the formation contains about 3 to about 15 weight percent of the overbased sulfonate.

Difficulties are sometimes encountered in the formation of the aqueous mixture due to the solubility characteristics of the anionic waterflood composition. When such solubility problems are detected, one can add an effective amount of any suitable solubilizer to promote solubility. The amount of the water-soluble solubilizer required in such instances will vary widely, but will generally be within the range of about 0.5 to about 25 weight percent, based on weight of the total composition. Examples of some suitable water-soluble solubilizers include aryl sulfonates, such as sodium benzene sulfonate, sodium xylene sulfonates, sodium toluene sulfonates, sodiumhexylbenzene sulfonates, sodium octylbenzene sulfonates, and the like; alcohol ethoxylates wherein the molecule contains about 30 to about 90 weight percent of ethylene oxide and the alcohol constituent contains about 2 to about 20 carbon atoms; lower olefin derived sulfonates derived from alkenes such as butenes and pentenes, and the like; and ethoxylated alkylphenols such as octylphenol.

It is to be understood that any sulfonates added as such as water-soluble solubilizer are not to be taken into account in determining the ratio "weight of excess base component/weight of sulfonate."

In order to more fully explain the present invention, the following examples are provided. However, it is to be understood that the examples are not intended to function as a limitation on the invention as described and claimed in the application.

EXAMPLE I

A total of 600 g of a normal alkane mixture having about 10 to about 12 carbon atoms per molecule, having an average molecular weight of 242, and having an average of 11.6 carbon atoms per molecule was charged to a stirred reactor. The normal alkane mixture was heated to 125°, and chlorine was added slowly over a period of 2 hours and 20 minutes. X-ray analyses of the product indicated a 30.4 percent chlorine content of the chlorinated alkane product.

The chlorinated alkane product was employed to alkylate benzene thus. A total of 728 g of the chlorinated alkane plus 1,169 g of the benzene was charged to a stirred reactor in a 4:1 mole ratio of benzene to chlorinated alkane product. Temperature of the reaction mixture rose from 26°C at the beginning to 65°C. A total of 30.6 g (4 weight percent based on the chloroparaffin) of $AlCl_3$ was added in small increments over the course of the reaction. Upon completion of the alkylation reaction, the reactor temperature was raised to 100°C at atmospheric pressure to distill off any unreacted benzene. Sludge was separated, and the product was water washed. A small remaining amount of benzene was stripped. The benzene-free product was then fractionally distilled into 20 portions, each of which constituted 5 weight percent of the benzene-free alkylate product.

Various composites of the cuts of the alkylate product were then sulfonated by adding 30 of oleum to 15 g of each composite with vigorous stirring in a stirred reactor over a 30-minute period with a temperature maintained at 65°C. The sulfonation products were post-stirred for 30 minutes at 65°C. The sulfonation products were quenched with 0.26 g of water per gram of oleumaused. Spent acid was split off and the upper layer of sulfonic acid derivative was neutralized with 15 weight percent sodium hydroxide in aqueous solution. Data for the various runs are found in the tables.

Control products were prepared as follows: The same procedure was employed for chlorination and alkylation of the branched-chain alkylates except that kerosene was employed instead of the mixture of normal alkanes as heretofore described. The chlorine kerosene contained 26.7 weight percent chlorine. Data pertaining to the control runs are found in Table I. Data pertaining to other parameters are also found in Table I.

A series of runs were then conducted to evaluate the oil recovery properties of the anionic waterflood additives of the instant invention. In each run, 12 × 2 × 2 inches Berea sandstone cores were evacuated under vacuum and then saturated with 5 weight percent sodium chlorine brine. The brine saturated cores were reduced to irreducible water saturation with 80 pale oil (a solvent refined Mid-Continent lubricating oil having a viscosity of 80 SUS at 100°F) and then waterflooded to residual oil saturation with a sodium chloride brine solution.

The waterflood additives were then injected into the cores as aqueous mixture containing amounts of sodium sulfonate and having overbased ratios as noted in the tables. Tertiary waterflood was then conducted at 40 cc of water/hour, a flow rate equivalent to 6–7 feet/day of reservoir flooding to determine the effectiveness of the overbased anionic waterflood additives as oil recovery agents. All of the oil recovery runs were conducted at about 72°F. The column entitled "ΔS" is the volume of oil produced as a percent of pore volume. The column entitled "ratio" is the value of the ratio: "weight of excess base component/weight of sulfonate."

of 3 weight percent based upon the chlorinated alkane charged. The sludge was split from the resulting second alkylate, formed in the presence of recycle distillate from a first alkylation, and the resulting alkylate was stripped of benzene. The benzene-free alkylation product (with recycle of distillate of alkylate) was then distilled to a light cut comprising 25 weight percent of the product, a heavier distillate cut comprising 25 weight percent of the product, a heavier distillate cut comprising 25 weight percent of the product, and a remaining bottoms portion containing 50 weight percent of the total alkylate product.

A composite of 4.45 g of the heavy distillate cut of the recycled alkylate and the 10.55 g of the bottoms portion of the recycled alkylate was sulfonated with oleum as heretofore described to yield 48.6 g of aqueous sulfonate mixture having the following analysis: 4.9 weight percent oil, 15 weight percent salt, 32.4 weight percent sulfonate, and having a combining or equivalent weight of 403.

These sulfonates were then employed as water-flood additives according to the procedure of Example I. Data and parameters are presented in the following Table II.

TABLE II

| Run No. | Wt. % of Chloro-Paraffin Used | Cuts Composited | Ratio | Wt. % of Total Alkylation Product | % Sodium Sulfonate | % salt (as $Na_2SO_4$) | % Oil | $\Delta S^{(1)}$ (% of Pore Volume) |
|---|---|---|---|---|---|---|---|---|
| 3 (Control) | 30 | (2) | 0 | 75 | 15.0 | 7.5 | 2.5 | 6.0 |
| 4 | 30 | (2) | 0.26 | 75 | 15.0 | 7.5 | 2.5 | 7.8 |

(1) ΔS values reported are at 130°F.
(2) The alkylation product which was employed was comprised of the bottoms material which comprised 50% of the total alkylation product and heavy distillate which comprised 25% of the total alkylation product.

Data are presented in the following, Table I.

TABLE I

| Run No. | Wt. % of Chlorinated Alkanes Used | Cuts Composited | Ratio | % Sodium Sulfonate | ΔS (% of Pore Volume) |
|---|---|---|---|---|---|
| 1 | 30 | 11-Btms | 0.03 | 25.33 | 8.3 |
| 2 (Control) | 27 | 11-Btms | 0.026 | 15.00 | 4.1 |

This example demonstrates use of the overbased anionic waterflood additives of the instant invention.

EXAMPLE II

A chlorination of normal alkanes was carried out as in Example I to give a chlorinated alkane derivative having 29.8 weight percent chlorine. Alkylation of the chlorinated alkane derivative was carried out as in Example I to give a benzene-free alkylate which was then distilled into a light cut containing 25 weight percent of the product, a heavier distillate cut containing 25 weight percent of the product and a bottoms portion containing the remaining 50 percent of the product.

A composite of cuts 1 and 2 of the alkylate product, which comprised a total of 119 g, plus 197 g of the chlorinated alkane product, plus 36 g of benzene was charged to a stirred reactor. This comprised a molar ratio of alkylate to chloroparaffin to benzene of 1:2:1. Aluminum chloride catalyst was charged in small increments at a reaction temperature of 65°C maximum until 5.9 g of aluminum chloride has been added, a total This example demonstrates the effectiveness of the anionic waterflood additives of the instant invention, wherein recycle of alkylate is employed in preparing the alkylate sulfonate.

EXAMPLE III

By way of further exemplification, the procedure of Example I is repeated except that the entire benzene-free alkylation product is sulfonated rather then certain distillation cuts thereof as in Example I. Also, sodium xylenesulfonate is employed to solubilize the anionic waterflood additive in the aqueous mixture.

Results comparable to Example I are obtained.

Having thus described the invention, we claim:

1. A process for recovering hydrocarbons from a petroliferous formation which comprises injecting into the formation an effective amount of an aqueous mixture which comprises about 0.5 to about 25 weight percent of an anionic waterflood additive comprising an overbased sulfonate derived by admixing sufficient base component with an alkylate sulfonate that the ratio: "weight of excess base component/weight of sulfonate" is about 0.03 to about 2.0; wherein the base component is an alkali metal hydroxide, ammonium hydroxide, or an alkali metal carbonate; and wherein the alkylate sulfonate is characterized as having been derived by:

a. chlorinating a normal alkane having about 10 to about 18 carbon atoms with chlorine to form a chlorinated alkane derivative having a chlorine content of about 15 to about 45 weight percent;

b. alkylating an aromatic hydrocarbon with the chlorinated alkane derivatives to form an alkylate product;
c. sulfonating the alkylate to form a sulfonic acid derivative; and
d. converting the sulfonic acid derivative to a sulfonate by reacting with the base component; and withdrawing from the formation hydrocarbon which has been displaced by the anionic waterflood additive.

2. The process of claim 1 wherein the base component is NaOH, LiOH, KOH, $Na_2CO_3$, or $Li_2CO_3$; wherein the alkylation reaction is conducted in the presence of an aluminum chloride catalyst; wherein the aromatic hydrocarbon which is alkylated with the chlorinated alkane derivative is benzene; wherein the chlorinated alkane derivative contains about 20 to about 35 weight percent chlorine; and wherein the ratio is abut 0.2 to about 1.0.

3. The process of claim 2 wherein the normal alkane has about 10 to about 12 carbon atoms; wherein the alkylate prior to sulfonation is subjected to fractional distillation; and wherein only the bottoms fraction remaining after fractional distillation at a temperature of about 190°C to about 240°C at 10 mm Hg pressure is sulfonated and employed.

4. The process of claim 2 wherein the normal alkane has about 10 to about 12 carbon atoms; wherein the alkylate product of the alkylation reaction is subjected to fractional distillation at a temperature of about 190°C to about 240°C; wherein the distillate distilled by the fractional distillation is recycled to the alkylation reaction; and wherein the bottoms fraction of the alkylation from the process with recycle is sulfonated and employed.

5. The process of claim 1 which includes the step of injecting into the formation subsequent to the anionic waterflood additive, an additional amount of about 10 to about 1,000 volume percent, based on the amount of the sulfonate containing slug, of additional aqueous mixture of base component, said aqueous mixture of base component containing about 0.5 to about 50 weight percent of base component.

6. The process of claim 5 wherein the base component is NaOH, LiOH, KOH, $Na_2CO_3$, or $Li_2CO_3$; wherein the alkylation reaction is conducted in the presence of an aluminum chloride catalyst; wherein the aromatic hydrocarbon which is alkylated with the chlorinated alkane derivative is benzene; wherein the chlorinated alkane derivative contains about 20 to about 35 weight percent chlorine; and wherein the ratio is about 0.2 to about 1.0.

7. The process of claim 1 which includes the steps of forming the anionic waterflood additive in situ in the petroliferous formation by the sequential steps of:
e. injecting into the formation an effective amount of an aqueous mixture containing about 0.5 to about 25 weight percent of alkylate sulfonate; and
f. injecting into the formation an aqueous mixture containing a sufficient amount of base component such that the ratio of the total materials injected is about 0.03 to about 2.0.

8. In a process for recovering hydrocarbons from petroliferous formations wherein anionic waterflood additives, injected into a formation through well bores, are employed to displace such hydrocarbons from the formations the improvement therein comprising employing an overbased sulfonate as the anionic waterflood additive, said overbased sulfonate is derived by admixing sufficient base component with an alkylate sulfonate that the ratio: "weight of excess base component/weight of sulfonate" is about 0.03 to about 2.0; the base component being an alkali metal hydroxide, ammonium hydroxide, or an alkali metal carbonate; and the alkylate sulfonate is obtained by:
a. chlorinating a normal alkane having about 10 to about 18 carbon atoms with chlorine to form a chlorinated alkane derivative having a chlorine content of about 15 to about 45 weight percent;
b. alkylating an aromatic hydrocarbon with the chlorinated alkane derivative to form an alkylate product;
c. sulfonating the alkylate to form a sulfonic acid derivative; and
d. converting the sulfonic acid derivative to the corresponding sulfonate salt by reacting with the base component.

* * * * *